US008412592B2

(12) United States Patent
Burnett (10) Patent No.: US 8,412,592 B2
(45) Date of Patent: Apr. 2, 2013

(54) SYSTEM AND METHOD FOR LOCATING PRODUCTS IN ASSOCIATION WITH PRODUCTIVITY AND COST INFORMATION (75) Inventor: Daniel H. Burnett, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 469 days.

(21) Appl. No.: 12/495,017

(22) Filed: Jun. 30, 2009

(65) Prior Publication Data

US 2010/0332338 A1 Dec. 30, 2010

(51) Int. Cl.
G06Q 30/00 (2012.01)
(52) U.S. Cl. ..................... 705/27.1; 705/26.1
(58) Field of Classification Search .............. 705/26, 705/27, 26.1–27.2
See application file for complete search history.

(56) References Cited

U.S. PATENT DOCUMENTS

| | | | | |
|---|---|---|---|---|
| 6,533,173 | B2 | 3/2003 | Benyak | 235/383 |
| 7,124,094 | B1* | 10/2006 | Kobayashi et al. | 705/26 |
| 7,158,946 | B2* | 1/2007 | Sato et al. | 705/27.1 |
| 7,309,009 | B2 | 12/2007 | Singer-Harter | 235/383 |
| 7,537,156 | B2 | 5/2009 | Singer-Harter | 235/383 |
| 2001/0006423 | A1* | 7/2001 | Subramaniam | 358/1.1 |
| 2002/0062385 | A1* | 5/2002 | Dowling | 709/230 |
| 2002/0103718 | A1* | 8/2002 | Matsuda et al. | 705/26 |
| 2002/0128850 | A1* | 9/2002 | Chen et al. | 705/1 |
| 2002/0143677 | A1* | 10/2002 | Prakash | 705/35 |
| 2002/0161831 | A1* | 10/2002 | Nakaoka et al. | 709/203 |
| 2005/0091118 | A1* | 4/2005 | Fano | 705/26 |
| 2006/0079247 | A1* | 4/2006 | Ritter | 455/456.1 |
| 2007/0118430 | A1* | 5/2007 | Wiseman et al. | 705/26 |
| 2008/0174570 | A1* | 7/2008 | Jobs et al. | 345/173 |
| 2009/0003659 | A1* | 1/2009 | Forstall et al. | 382/113 |
| 2009/0005072 | A1 | 1/2009 | Forstall et al. | 455/456.1 |
| 2009/0131035 | A1 | 5/2009 | Aiglstorfer | 455/419 |
| 2009/0254753 | A1* | 10/2009 | De Atley et al. | 713/176 |

OTHER PUBLICATIONS

Nancy, R. B. (Jul. 15, 1997). California; kinko's to enter virgin (group) territory—britain. Los Angeles Times.*
USPTO U.S. Appl. No. 12/424,103, filed Apr. 15, 2009; Inventor: Eugene Stephen Evanitsky.

* cited by examiner

Primary Examiner — Jeffrey A Smith
Assistant Examiner — Resha Desai
(74) Attorney, Agent, or Firm — Kermit D. Lopez; Luis M. Ortiz; Kevin Soules (57) ABSTRACT A system and method for locating a product and associated information within a region utilizing a mobile application. Information such as location, cost, and productivity information with respect to the rendering device(s) can be stored in a database associated with a customer accessible unit. A mobile interface configured with a web browser can communicate with the database in order to locate an optimal product based on preferred criteria. A mobile application may include a progressive disclosure menu that provides quick access to productive print solutions and appropriate resources and contacts. The mobile interface can utilize the Global Positioning System to compare the current location to the closest location of optimal rendering device that meet the applied criterion.

19 Claims, 5 Drawing Sheets

SYSTEM AND METHOD FOR LOCATING PRODUCTS IN ASSOCIATION WITH PRODUCTIVITY AND COST INFORMATION

TECHNICAL FIELD

Embodiments are generally related to rendering devices such as printers, scanners, multi-function devices, photocopy machines, and the like. Embodiments are also related to telecommunications systems and techniques. Embodiments are additionally related to methods for locating particular products and associated information.

BACKGROUND OF THE INVENTION

Rendering devices and associated products are utilized in a wide variety of environments such as, for example, drug stores, libraries, computer labs and so forth. Rendering devices include components such as printers, scanners, faxes, copy machines, and the like. It is desirable to locate and organize such products in order to maintain competitive productivity with effective solutions. Presently, an enormous amount of time, money, and effort is being expended by companies to provide product related information after a product purchase has taken place.

For decades, various types of media have been utilized to realize such fundamental business functions. The majority of prior art approaches to the acquisition and delivery of product information to potential purchasers and users involve some form of online or direct contact with respect to particular products. Such techniques include media such as online presentations, brochures and samples associated with the product. Such approaches, however, are costly and time consuming and are not sufficiently customized to thoroughly evaluate the merits of a particular product. Additionally, such methods require substantial financial overhead that may ultimately hinder the ability to reach a significant portion of the market.

Based on the foregoing, it is believed that a need exists for an improved system and method for determining the location, cost, and productivity information associated with product offerings of rendering devices utilizing a mobile application. A need also exists for an improved method for tracking location information associated with such products via a global positioning system (GPS).

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for locating products such as printers, scanners, multi-function devices, photocopy machines, and the like.

It is another aspect of the present invention to provide for an improved method for determining the location, cost, and productivity information associated with particular products utilizing a mobile application.

A further aspect of the present invention is to provide for an improved method for tracking location information associated with particular products via a GPS (Global Positioning System) module.

The aforementioned aspects and other objectives and advantages can now be achieved as described herein. A system and method for locating products and associated information within a region utilizing a mobile application is disclosed. Data such as location, cost, and productivity information with respect to the products can be stored in a database associated with a customer accessible unit. A mobile interface configured with a web browser can communicate with the database in order to locate an optimal product, such as a rendering device, based on a particular user requirement. The mobile application can include the display of a progressive disclosure menu that provides quick access to productive solutions and connect users with appropriate resources and contacts. The mobile interface can utilize a GPS module to compare a current location to the closest location of the optimal product that meets the applied criterion.

A query can be implemented via the mobile interface to match a document processing requirement to the attributes associated with various products. Information regarding the product(s), such as the distance from a current location, cost per page, speed, and color capabilities, etc., can be provided via the mobile interface. Based on such displayed information, a user can select the best product option and directions can be generated for the selected location via a GPS module.

The disclosed approach can also provide additional web information such as a drive time estimate for user convenience and can function as an add-on tool in association with a remote job submission tool. A private database can additionally be provided within a workplace environment or other appropriate organizational entity, where a user can find, for example, the closest rendering device within the workplace. An option to input personal rendering device information can be provided in order to allow per page cost comparisons. The mobile interface can be utilized to find productive print solutions and optimal productive print options, while saving search and print time. Such an approach allows a user to quickly determine the closest available rendering device with price and time comparisons.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed method and system provides productivity and cost information about particular products (e.g., rendering devices), which facilitates to the selection of an optimal product within a particular region. Location information concerning the product can be traced via an associated GPS module, which is discussed in greater detail herein. Various computing environments may incorporate capabilities for supporting the users accessing the networks on which the rendering devices reside. The following discussion is intended to provide a brief, general description of suitable computing environments in which the method and system may be implemented. Although not required, the method and system will be described in the general context of computer-executable instructions, such as program modules, being executed by a single computer.

Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

Figure 1:
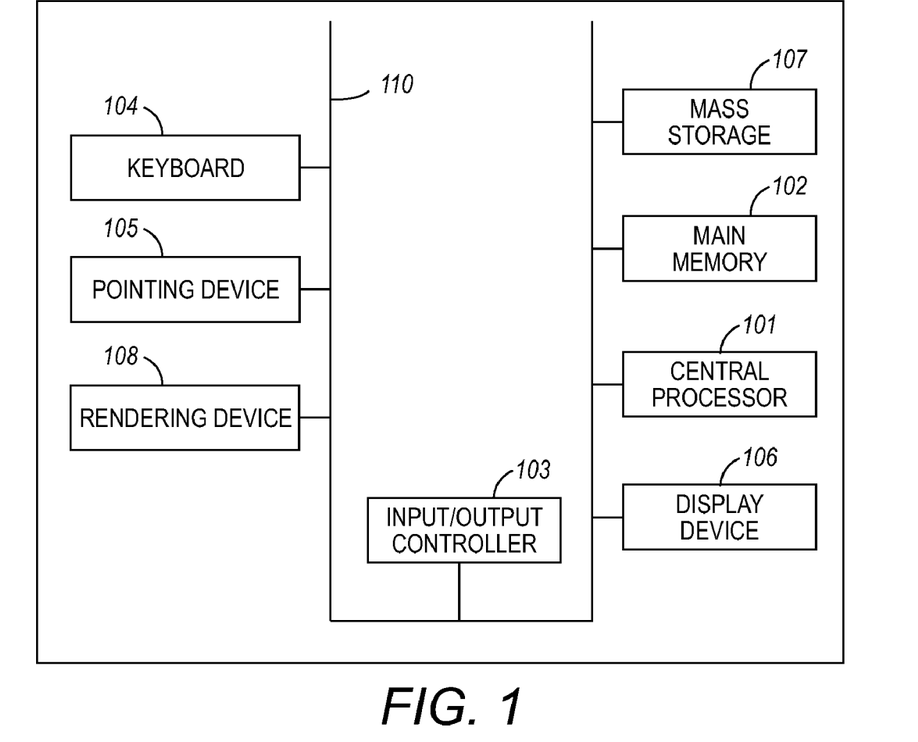
FIG. 1 illustrates a schematic view of a computer system in which the present invention may be embodied.
Figure 2:
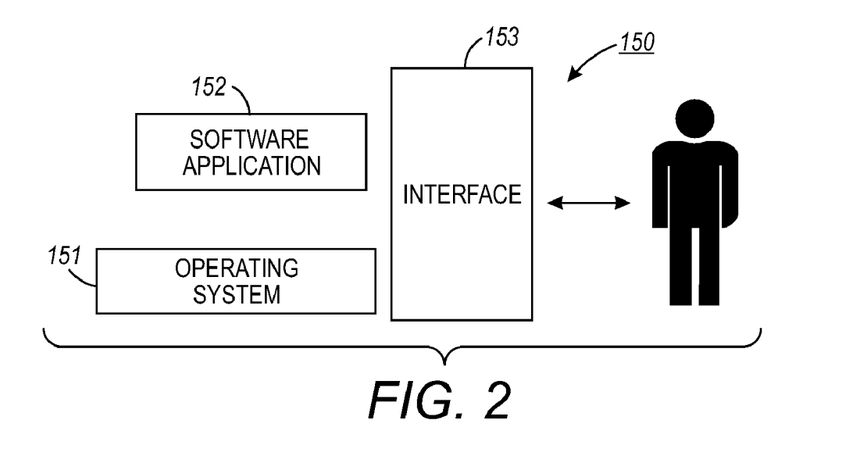
FIG. 2 illustrates a schematic view of a software system including an operating system, application software, and a user interface for carrying out the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, may be included in the data-processing apparatus 100 as desired. The rendering device 108 may be a standalone single function device such as a dedicated printer, scanner, copy machine, etc. Preferably, rendering device 108 may function as a MFD (Multifunction Device) capable of multiple rendering functions such as printing, copying, scanning, faxing, etc.

As illustrated, the various components of the data-processing apparatus 100 communicate through an electrical connection 110, such as, for example, a system bus, a USB (Universal Serial Bus), or other similar architecture. It can be appreciated that the data-processing apparatus 100 may, in some embodiments, constitute a mobile computing device such as a Smartphone, a laptop computer, iPhone, etc. In other embodiments, data-processing apparatus 100 may function as a desktop computer, server, and the like, depending upon design considerations. In still other embodiments, the functionality of data-processing apparatus 100 may be distributed across a variety of different types of mobile and networked devices such as cellular telephones, Smartphones, laptop computers, servers, desktop workstations, and so forth.

FIG. 2 illustrates a computer software system 150 for directing the operation of the data-processing apparatus 100 depicted in FIG. 1. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and application module 152.

A graphical user interface (GUI) 153, also serves to display results, whereupon the user may supply additional inputs or terminate a given session. In one possible embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and GUI 153. Application module 152, on the other hand, can include instructions such as the various operations described herein with respect to the various components and modules described herein such as, for example, the method 600 depicted in FIG. 6.

The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Mac OS, UNIX, LINUX, and the like. Therefore, the description of the exemplary embodiments, which follows, is for purposes of illustration and not considered a limitation.

Figure 3:
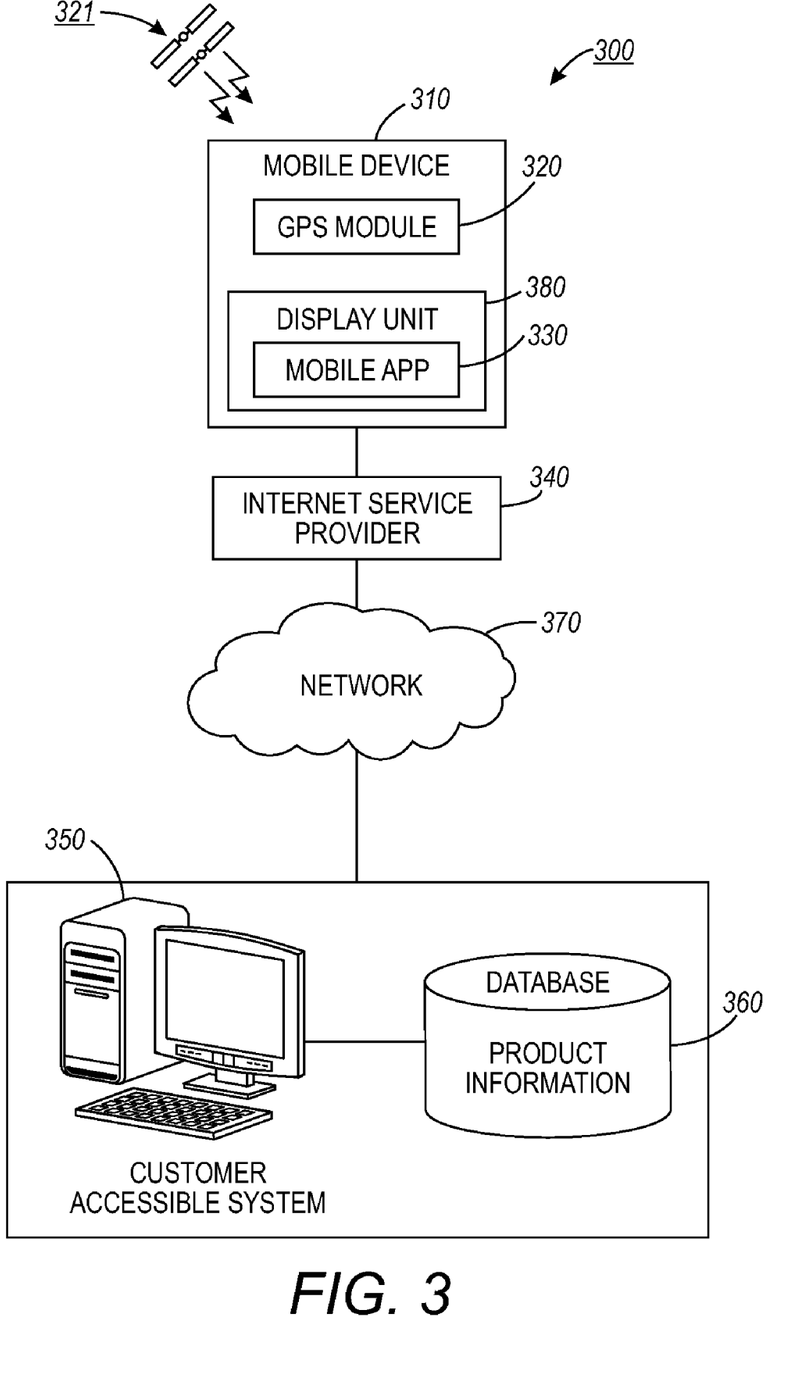
FIG. 3 illustrates a block diagram of a product locating system for locating rendering devices with associated information utilizing a mobile application, in accordance with an embodiment.

FIG. 3 illustrates a block diagram of a product locating system 300 for locating products and associated information using a mobile application 330 in accordance with an embodiment. Note that in FIGS. 1-6, identical or similar blocks are generally indicated by identical reference numerals. The product locating system 300 generally includes a customer accessible unit 350 associated with a database 360 and a wireless mobile device 310 associated with a specialized mobile application 330, which can be displayed for a user via the display unit 380 of the mobile device 310. Note that the mobile device 310 may be a mobile unit such as a cellular telephone, Smartphone, iPhone, Blackberry or other types of devices, including, for example, a laptop computer. Rendering device 108 is an example of a product that may be identified and located via system 300. Information associated with the rendering device 108 with a particular region, for example, can be stored in the database 360 utilizing the customer accessible unit 350. Note that as utilized herein, the term "rendering device" may refer to an apparatus or system such as a printer, scanner, fax machine, copy machine, etc., or a combination thereof.

Note that the specialized mobile application 330 may run within a browser or may be implemented as a native mobile application, which may use information from the World Wide Web (i.e., the "Web"). Such mobile applications may not actually run within what is known as a "browser" in the typical sense, which exists with respect to some mobile devices. The disclosed concept can thus be implemented in the context of a Web application wherein a version may be viewed anywhere; however, a key advantage of the disclosed embodiments is their availability as mobile applications.

Note that the term World Web Web (commonly abbreviated as "the Web") is a system of interlinked hypertext documents accessed via the Internet. With a Web browser, one can view Web pages that may contain text, images, videos, and other multimedia and navigate between them using hyperlinks. The World Wide Web enables the spread of information over the Internet through an easy-to-use and flexible format. It thus played an important role in popularizing the use of the Internet. Note that the terms Internet and World Wide Web are often used in every-day speech without much distinction. However, the Internet and the World Wide Web are not one and the same. The Internet is a global data communications system. It is a hardware and software infrastructure that provides connectivity between computers. In contrast, the Web is one of the services communicated via the Internet. It is a collection of interconnected documents and other resources, linked by hyperlinks and URLs. In short, the Web is an application running on the Internet.

The wireless mobile device 310 can communicate with the database 360 via a network 370, such as the Internet. The wireless mobile device 310 may be a wireless device such as, for example, a Smartphone, a wireless personal digital assistant (PDA) or the like. The network 370 may be, for example, the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including countless commercial, government, educational and other computer systems that route data and messages. FIG. 3 is intended as an example and not as an architectural limitation with respect to varying embodiments of the present invention.

In general, system 300 can be practiced in connection with a globally-based digital telecommunications network (known as the Internet). In general, the Internet infrastructure comprises Internet Service Providers (ISPs), Network Service Providers (NSPs), routers, telecommunication lines channels, and so forth. The wireless mobile device 310 can be configured to access the network 370 via ISP 340. The wireless mobile device 310 is preferably configured to include a digital bi-directional communications connection with the ISP 340. After the wireless mobile device 310 connects to the network 370 via the ISP 340, a user may utilize the mobile device 310 to surf or browse the network 370 via the wireless mobile device 310. The wireless mobile device 310 may also be configured to include a display unit 380, such as a liquid crystal display (LCD), for displaying information. The customer accessible unit 350 may be any suitable workstation or other device, such as data processing system 100 depicted in FIG. 1, for communicating with the wireless mobile device 310 and rendering devices, such as rendering device 108.

The customer accessible unit 350 communicates with the wireless mobile device 310 via the Internet 370 utilizing any suitable protocol. According to one embodiment of the present invention, the wireless mobile device 310 utilizes the file transfer protocol (FTP) in order to access product information from the database 360 via the Internet 370. Location information, cost data, and productivity information related to the product (or products) can be stored in the database 360. The GPS module 320 can be utilized to compare the current location of the mobile device to the closest location of the product that meets the applied criterion, in response to a request via the mobile device 310. In general, the GPS module 320 can communicate with a GPS satellite 321.

Figure 4:
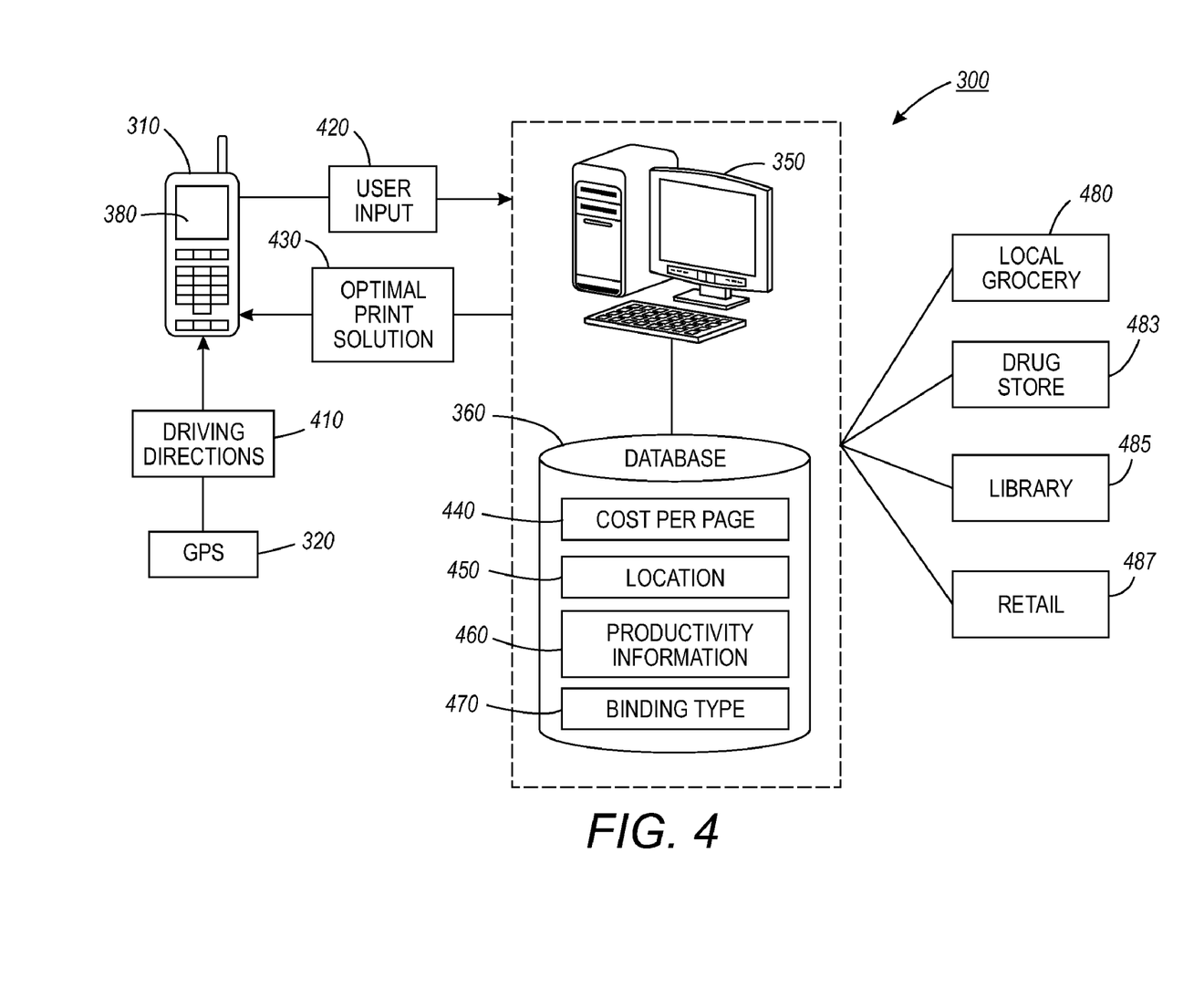
FIG. 4 illustrates a block diagram of the product locating system for determining location, cost, and productivity information associated with the rendering devices, in accordance with an embodiment.

FIG. 4 illustrates a block diagram of the product locating system 300 for determining location, cost, and productivity information associated with particular products, in accordance with an alternative embodiment. Job information can be displayed as user input 420 via the display unit 380 associated the mobile device 310 and the web browser 330. In general, the specialized mobile application 330 may be a software application utilized for retrieving, presenting, and traversing information resources on the World Wide Web. An information resource is identified by a Uniform Resource Identifier (URI) and may be, for example, a web page, image, video, or other content. The user input 420 can be transmitted to the customer accessible unit 350 via the network 370. The database 360, which communicates with the customer accessible unit 350, may store data associated with a number of varying product locations such as, for example, a local grocery store 480, a drug store 483, a library 485, a retail photocopy/printing establishment 487 (e.g., a Kinko's® store), and so forth.

The records stored in the database 360 may be for example, but not limited to, data concerning the distance from the user location to the product location 450, cost per page 440, productivity information 460, binding type 470 and so forth. The system 300 can calculate an optimal print solution 430 for rendering the user's document and also provide a list of rendering device locations to the user based on the user's preferences. The user can select the best option via his or her mobile device 310 and can be provided with driving directions 410 for the selected location via the GPS module 320.

Figure 5:
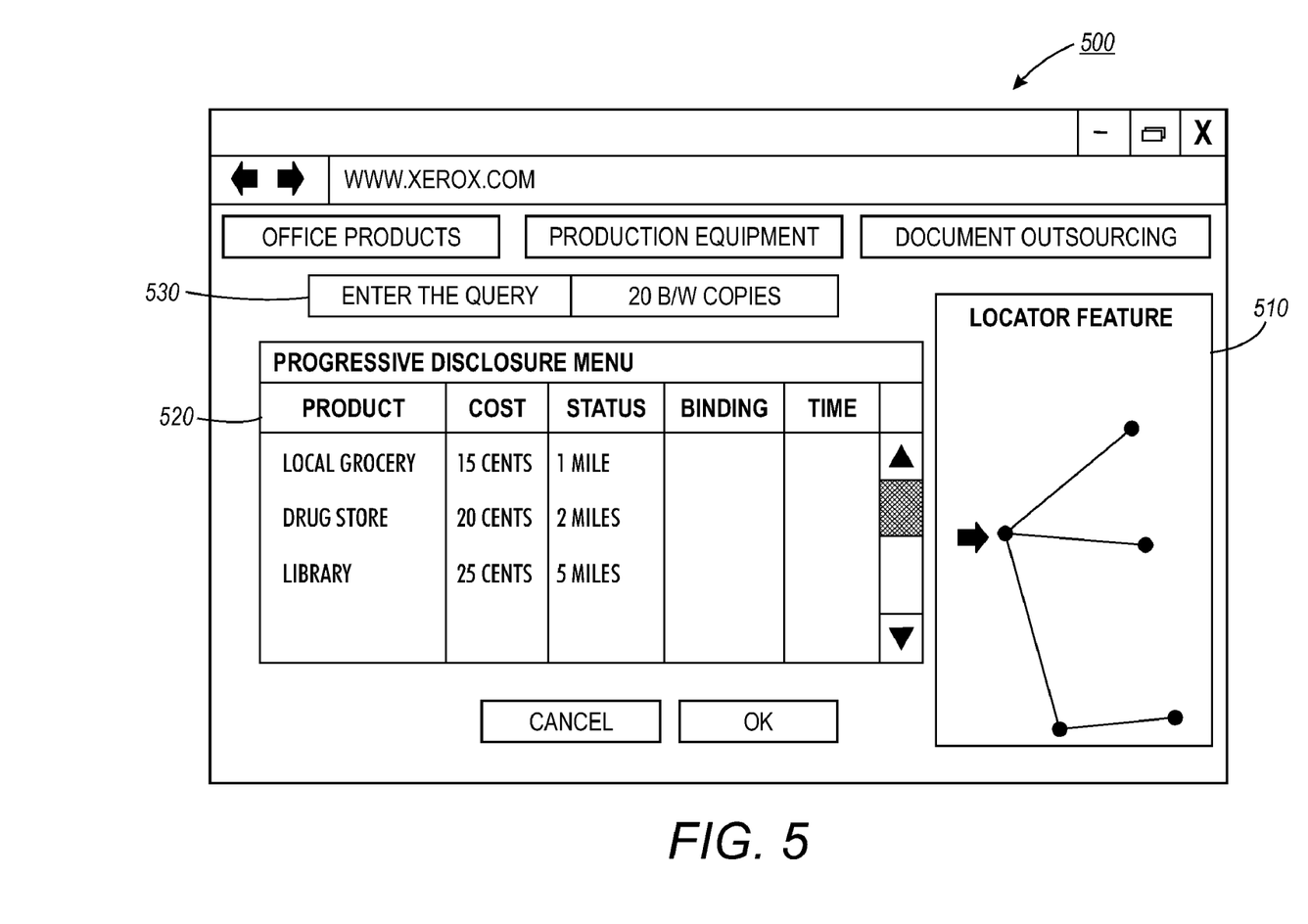
FIG. 5 illustrates a graphical user interface with a progressive disclosure menu for locating rendering devices with associated information, in accordance with an embodiment.

FIG. 5 illustrates a GUI 500 with a progressive disclosure menu 520 for locating rendering devices with associated information, in accordance with an embodiment. The mobile device 310 can be configured with the specialized mobile application 330 to find optimal rendering devices with associated information. The GUI 500 can, for example, support the specialized mobile application 330. Note that the term interface, as utilized herein, generally refers to a type of environment that represents programs, files, options and so forth by means of graphically displayed icons, menus, and dialog boxes on a screen. GUI 500 is an example of such an interface. The user can interact with the GUI 500 to select and activate such options by pointing and clicking with a user input device such as, for example, a touch screen, a keyboard, a mouse, and so forth. A particular item may function in the same manner to the user in all applications because the user interface provides standard software routines to handle these elements and reports the user's actions. The progressive disclosure menu 520 is an interaction design technique that sequences information and actions across several screens in order to minimize the tendency to overwhelm the user.

The graphical user interface 500 can include the progressive disclosure menu 520, which provides quick access to a user for productive print solutions and is also capable of connecting the user with appropriate resources and contacts. For example, if the user inputs a query 530 for rendering 20 black and white copies, then the system 300 can calculate the optimal productivity and cost of a product (e.g., rendering device) utilizing information stored in the database 360 and also generate a list of products via the progressive disclosure menu 520.

As depicted in FIG. 5, the GUI 500 can be displayed with a list of productive information such as, for example, the cost per copy in the local grocery can be 15 cents and the distance from the user location can be 1 mile. Similarly, the cost per copy in the drug store can be 20 cents and the distance from the user location can be 2 miles. Furthermore, the cost per copy in the library can be 25 cents and the distance from the user location can be 5 miles.

The user can select an optimal option from the information obtained in the progressive disclosure menu 520 for rendering the 20 black and white copies. Also, for rendering multiple large sets of document additional information such as, cost per book, types of binding available within the product location 480 and time taken to reach the product location 480 from the user location can be provided in the GUI 500. The more advanced information can be, for example, Kinko's, 10 miles away, job run time can be 15 minutes, $20 per book, 3 types of binding available. Independent print shop, 20 miles away, job run time can be 1 hour, $15 per book, 1 binding type available. Lulu® online can bring the price to $17 per book, delivery time 3 days, 5 binding types available.

The user can select the optimal product location and the location information can be traced via the GPS module 320. The GPS module 320 can generate a driving direction feature 510 for the user selected product location which guides the user towards the product location 450 in an optimal way. Further, the GUI 500 can provide an option for the user to input personal rendering device information which can allow per page cost comparisons. The calculation can require area coverage information which can be available for real jobs; however, a quicker ballpark cost estimate can also be included. If the user selects between pictures of a B/W text document, full color, or one of a few types of mixtures, then a rough area coverage value can be established. Such images can usually be differentiated on the mobile display 380.

Note that the area coverage information can be combined with the rendering device model information to calculate a per page cost 440 with supplies costs assumed via look up table, or other pricing scheme such as that used, for example, with Xerox ColorCube™. The priority of the search items can be changed such as, for example, from ranked in order of lowest travel time to lowest usage cost if a large number of rendering devices are found within the search area. The icons presented can allow user to drill down into any topic. For example, Lulu.com possesses several faster shipping and production options, so the GUI 500 includes displayable menus that can allow exploration of more detail and/or redirect a user via the GUI 500 to a server.

Figure 6:
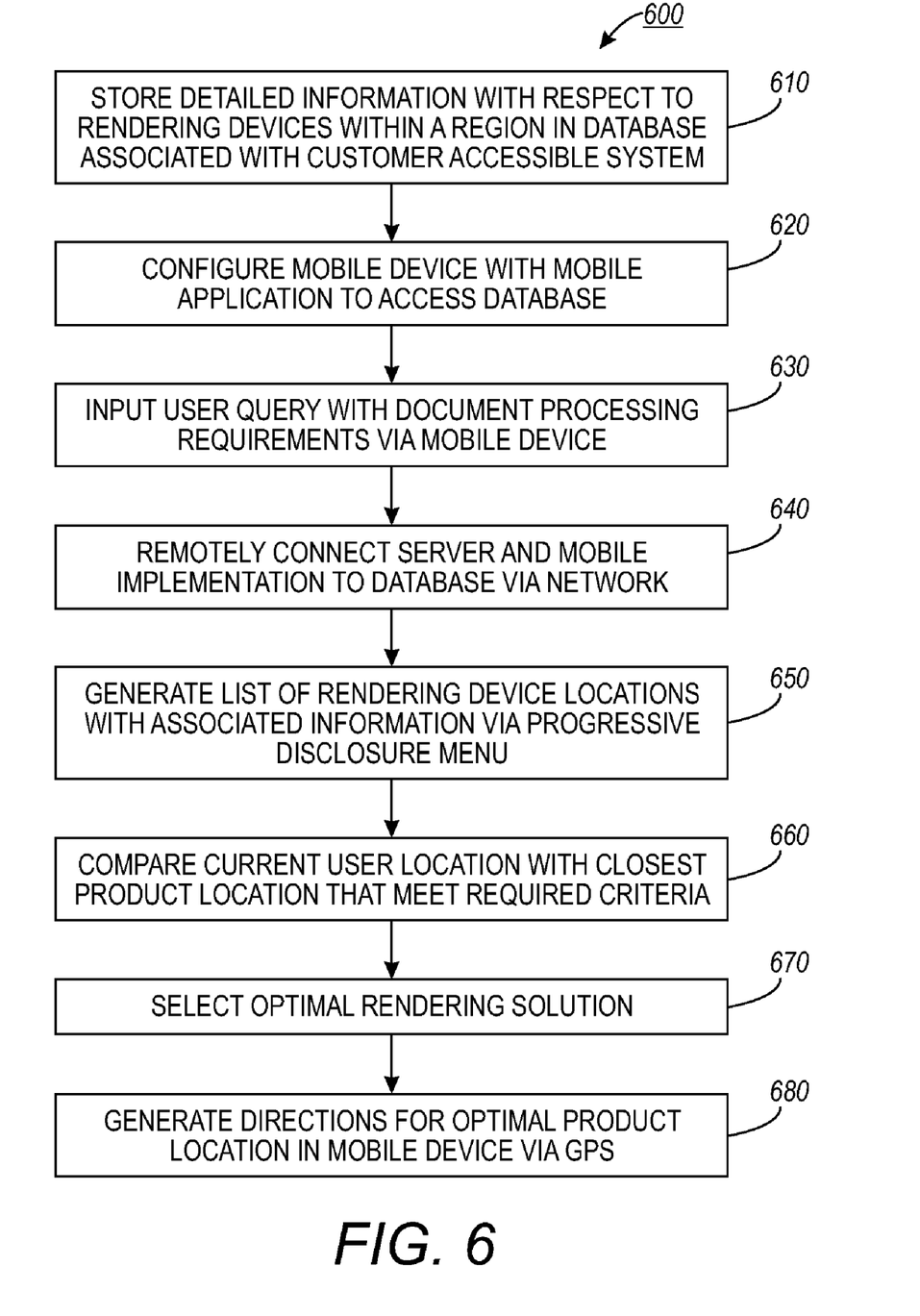
FIG. 6 illustrates a high level flow chart of operation illustrating logical operational steps of a method for locating rendering devices with associated information utilizing a mobile application, in accordance with an embodiment.

FIG. 6 illustrates a high level flow chart of operation illustrating logical operational steps of a method 600 for locating rendering devices with associated information utilizing a mobile application, in accordance with an embodiment. The detailed information regarding rendering devices within a region can be stored in the database 360 associated with the customer accessible unit 350, as depicted at block 610. The mobile device 310 can be configured with the specialized mobile application 330 in order to access the database 360, as illustrated at block 620. The user query 530 with document processing requirement can be inputted via the mobile device 310, as indicated at block 630.

A server can be connected to the database 360 via the customer accessible unit 350, as illustrated at block 640. The list of rendering device locations 480 with associated information can be generated via the progressive disclosure menu 520, as depicted at block 650. The current location with the closest product location that meet the required criterion can be compared, as illustrated at block 660. The optimal rendering solution for the user query can be selected from the list of rendering products, as indicated at block 670. The directions for optimal product location can be generated in the mobile device 310 via the GPS module 320, as depicted at block 680.

The system 300 also uses additional information commonly available on the web to make comparisons quite sophisticated. For example, the drive time estimates can be presented for several options and compared with the print production time estimates for the options. For example, if a user needs 100 copies and the closest retail photocopy/printing establishment is 10 miles away, but there is another device running at an Office Max 5 miles away, it can be identified remotely. Such an approach can be utilized as an add-on tool to a remote job submission tool. For example, a user can have a real document that they required to be rendered in quantity. The "virtual" screens utilized to pre-program the job can be used to select nearby options.

The pickup location can also be provided at the time of job submission. Additionally, separate private database can be maintained within a workplace where the user can find a closest rendering device within the workplace. An option to input personal rendering device information can be provided in order to allow per page cost comparisons. The mobile interface 310 can be utilized to find productive print solutions, the most productive print option, and save search and print time. Such an approach allows user to quickly find the closest available device with price and time comparisons.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for locating products, said method comprising:
storing in a database, information with respect to at least one product within a region;
locating said at least one product based on particular criteria input through a mobile interface remotely connected to said database;
displaying a progressive disclosure menu of said mobile interface, providing particular data associated with said at least one product including a list of said at least one product's locations in association with said information in response to input of said particular product specific criteria via said mobile interface, wherein said progressive disclosure menu is configured to sequence said data across a plurality of screens; and
generating additional information associated with said at least one product based on said particular criteria provided on said progressive disclosure menu, wherein said additional information includes a driving time estimate with respect to a location of said at least one product, a print production time estimate associated with said at least one product, a cost per book associated with said at least one product, and a listing of types of binding available with respect to said at least one product.

2. The method of claim 1 further comprising:
associating a GPS module with said mobile interface; and
determining a current location of said mobile unit to permit a comparison of said current location to the closest location of said at least one product based on said particular criteria.

3. The method of claim 1 wherein said at least one product comprises a rendering device.

4. The method of claim 1 wherein said information comprises a location of said at least one product and directions to said location of said at least one product generated by said GPS module associated with a mobile interface.

5. The method of claim 1 wherein said information comprises a cost per page of media associated with said at least one product.

6. The method of claim 1 wherein said information comprises productivity data associated with said at least one product.

7. The method of claim 1 further comprising querying via said mobile interface to match a document processing requirement to said plurality of information associated with said at least one product.

8. The method of claim 1 further comprising selecting at least one preferred product based on an optimal product solution of said at least one product via said progressive disclosure menu associated with said mobile interface.

9. The method of claim 1 further comprising configuring said mobile interface to include a specialized mobile application for input of said particular criteria.

10. The method of claim 9 further comprising configuring said mobile application as an add-on tool in association with a remote job submission tool wherein said add-on tool uses web-based information to produce drive time estimates for said at least one product location.

11. The method of claim 1 further comprising accessing a private database that compares data indicative of publicly available machine costs and productivity against additional information concerning private rendering devices.

12. A system for locating products, said system comprising:

a processor;

a data bus coupled to said processor; and a computer-usable medium embodying computer code, said computer-usable medium being coupled to said data bus, said computer program code comprising instructions executable by said processor and configured for:

storing in a database, information with respect to at least one product within a region;

locating said at least one product based on particular criteria input through a mobile interface remotely connected to said database;

displaying in a progressive disclosure menu of said mobile interface, providing particular data associated with said at least one product including a list of said at least one product's locations in association with said information in response to input of said particular product specific criteria via said mobile interface, wherein said progressive disclosure menu is configured to sequence said data across a plurality of screens;

selecting at least one optimal product of said at least one product via said progressive disclosure menu associated with said mobile interface; and generating additional information associated with said at least one product based on said particular criteria provided on said progressive disclosure menu, wherein said additional information includes a driving time estimate with respect to a location of said at least one product, a print production time estimate associated with said at least one product, a cost per book associated with said at least one product, and a listing of types of binding available with respect to said at least one product.

13. The system of claim 12 wherein said instructions are further configured for:

associating a GPS module with said mobile interface; and determining a current location of said mobile unit to permit a comparison of said current location to the closest location of said at least one product based on said particular criteria.

14. The system of claim 12 wherein said information comprises a cost per page of media associated with said at least one product.

15. The system of claim 12 wherein said information comprises productivity data associated with said at least one product.

16. The system of claim 12 wherein said instructions are further configured for querying via said mobile interface to match a document processing requirement to said plurality of information associated with said at least one product.

17. The system of claim 12 further comprising modifying said mobile interface to include a specialized mobile application for input of said particular criteria, wherein said mobile application comprises an add-on tool in association with a remote job submission tool wherein said add-on tool uses web-based information to produce drive time estimates for said at least one product location.

18. A system for locating products, said system comprising:

a processor;

a data bus coupled to said processor; and a computer-usable medium embodying computer code, said computer-usable medium being coupled to said data bus, said computer program code comprising instructions executable by said processor and configured for:

storing in a database, information with respect to at least one product within a region;

locating said at least one product based on particular criteria input through a mobile interface remotely connected to said database;

displaying in a progressive disclosure menu of said mobile interface, providing particular data associated with said at least one product including a list of said at least one product's locations in association with said information in response to input of said particular product specific criteria via said mobile interface, wherein said progressive disclosure menu is configured to sequence said data across a plurality of screens;

associating a GPS module with said mobile interface;

determining a current location of said mobile unit to permit a comparison of said current location to the closest location of said at least one product based on said particular criteria;

determining and displaying an area coverage value on said mobile unit wherein said area coverage value provides a per page cost comparison for said at least one product based on said particular criteria; and generating additional information associated with said at least one product based on said particular criteria provided on said progressive disclosure menu, wherein said additional information includes a driving time estimate with respect to a location of said at least one product, a print production time estimate associated with said at least one product, a cost per book associated with said at least one product, and a listing of types of binding available with respect to said at least one product.

19. The system of claim 18 wherein said instructions are further configured for:

modifying said mobile interface to include a specialized mobile application for input of said particular criteria, wherein said mobile application comprises an add-on tool in association with a remote job submission tool wherein said add-on tool uses web-based information to produce drive time estimates for said at least one product location.

* * * * *